United States Patent Office 3,363,230
Patented Jan. 9, 1968

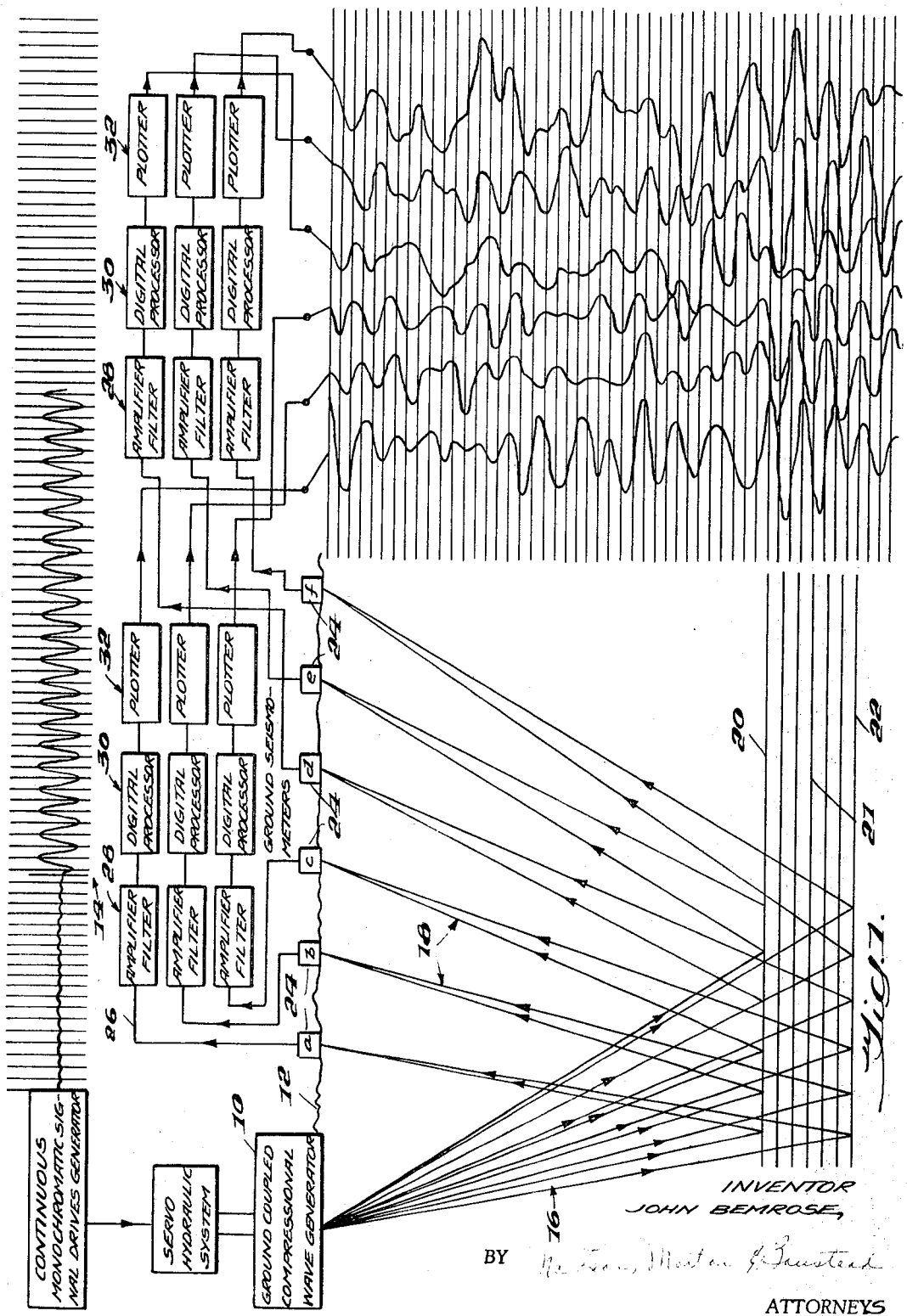

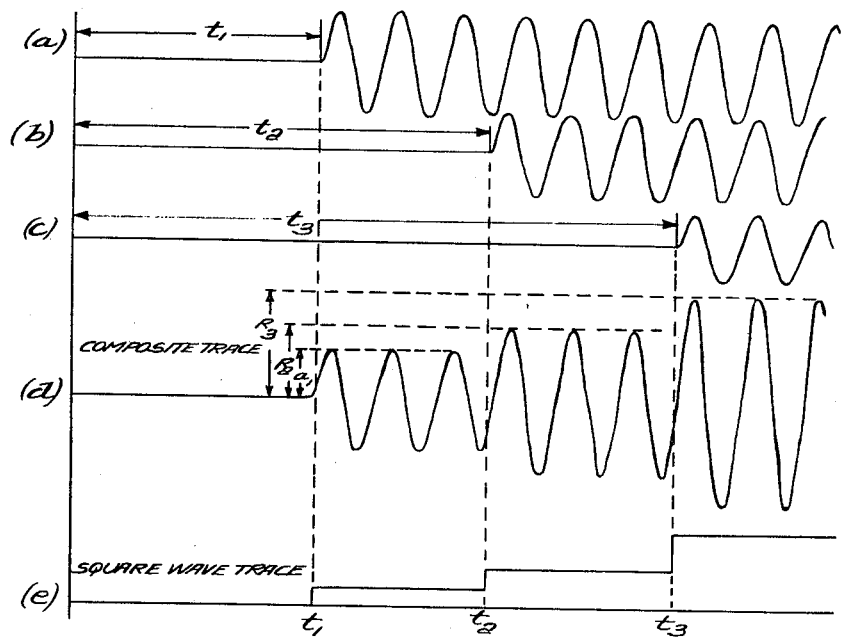
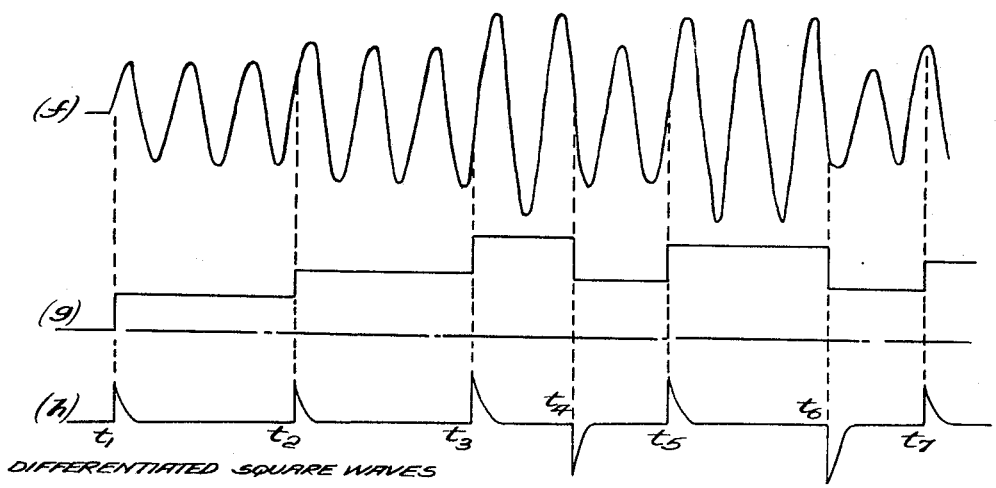

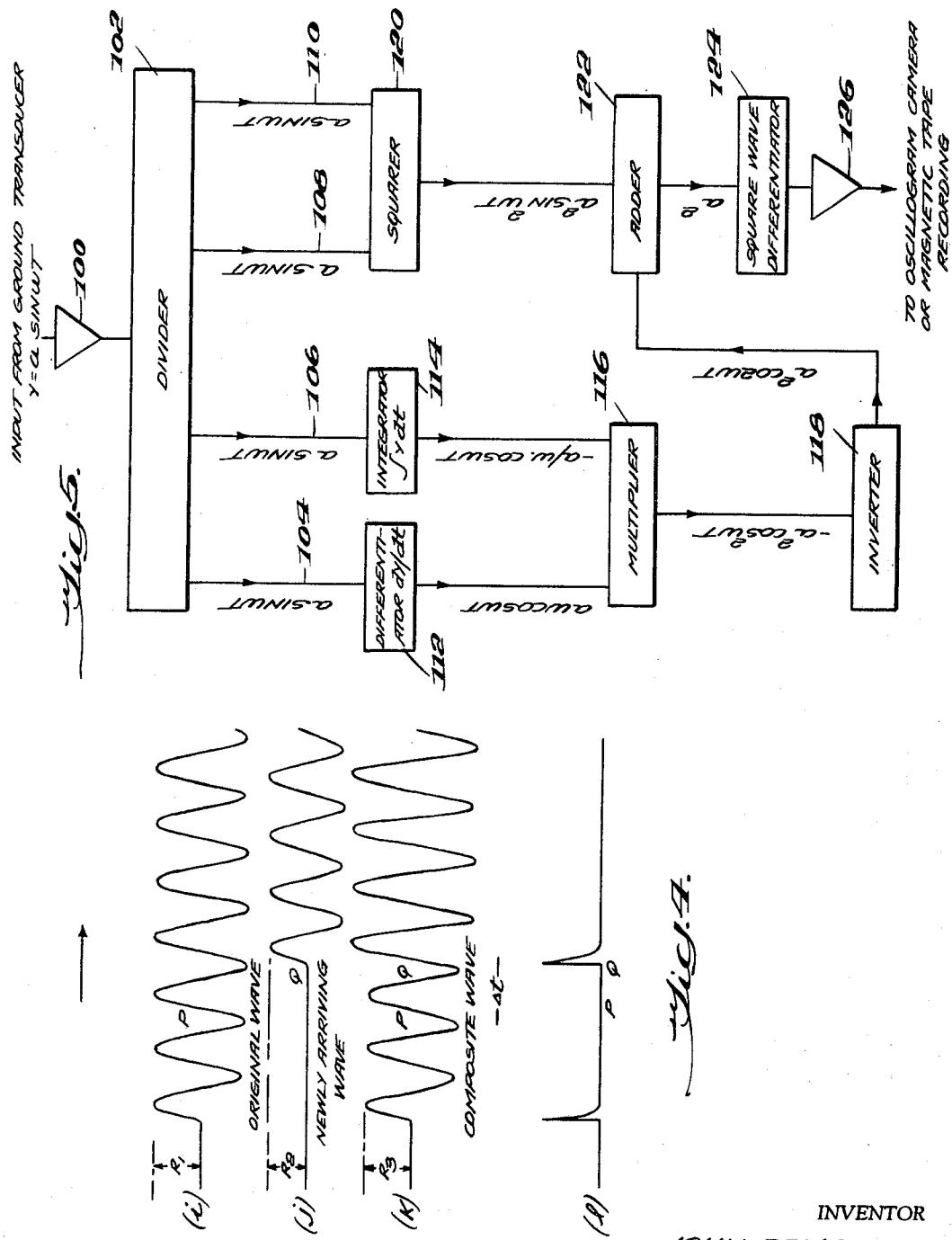

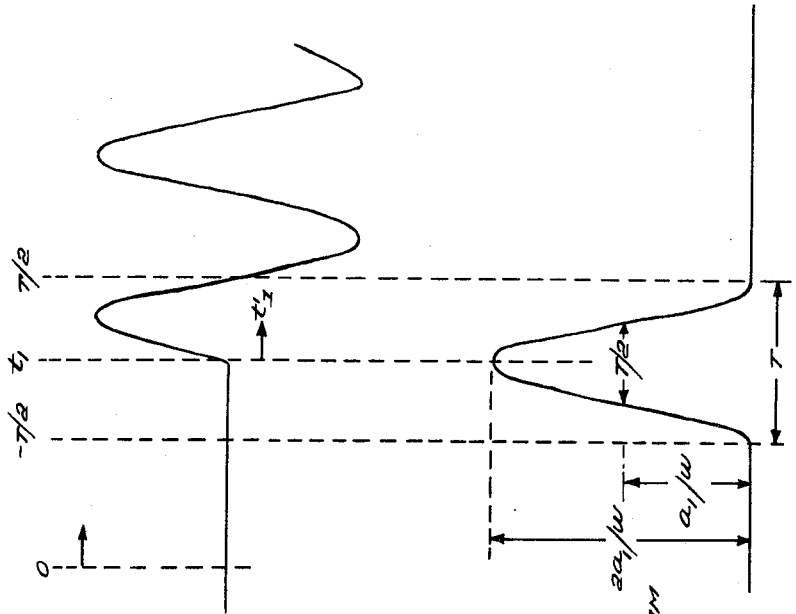
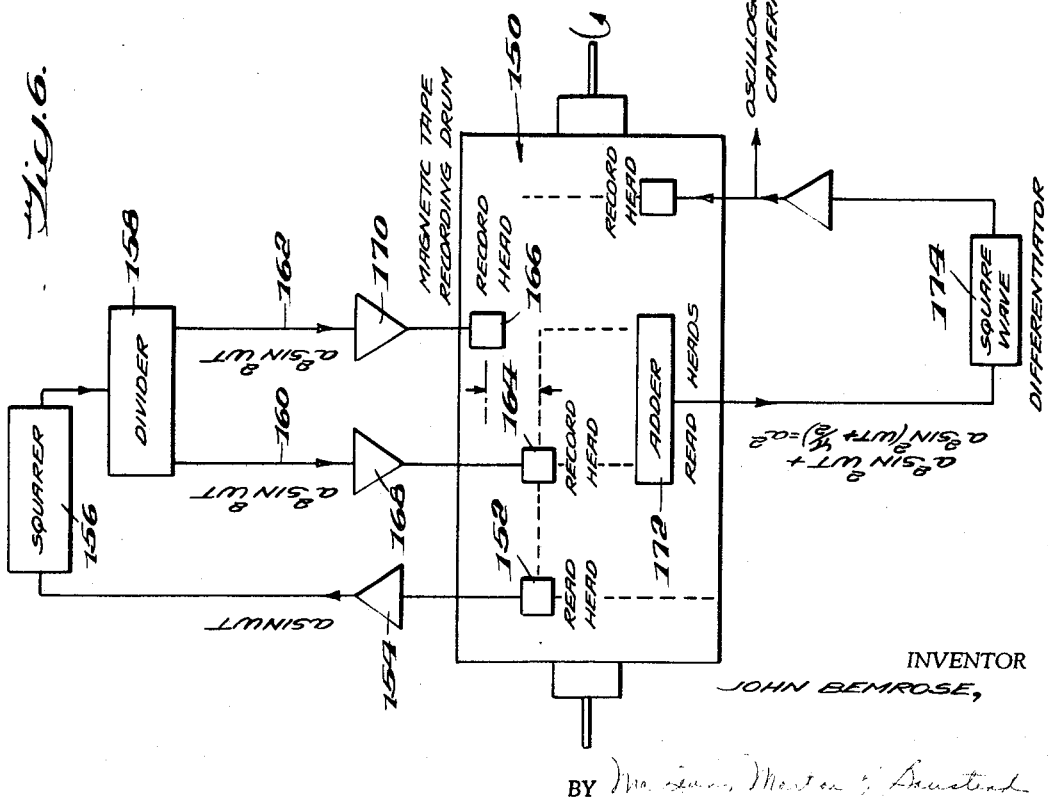

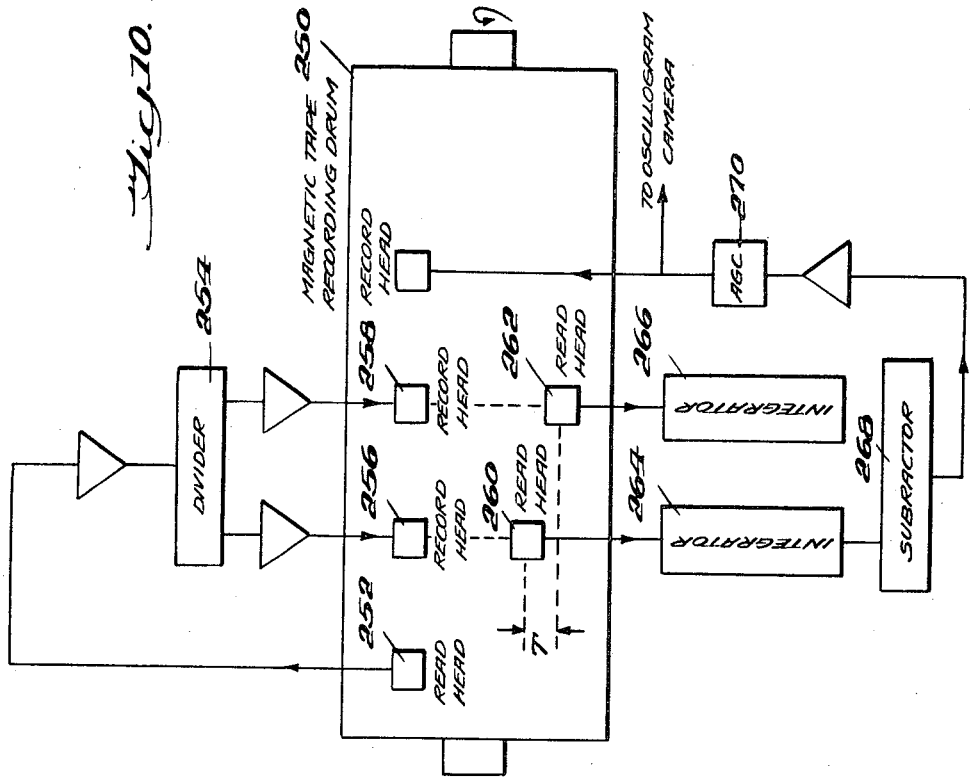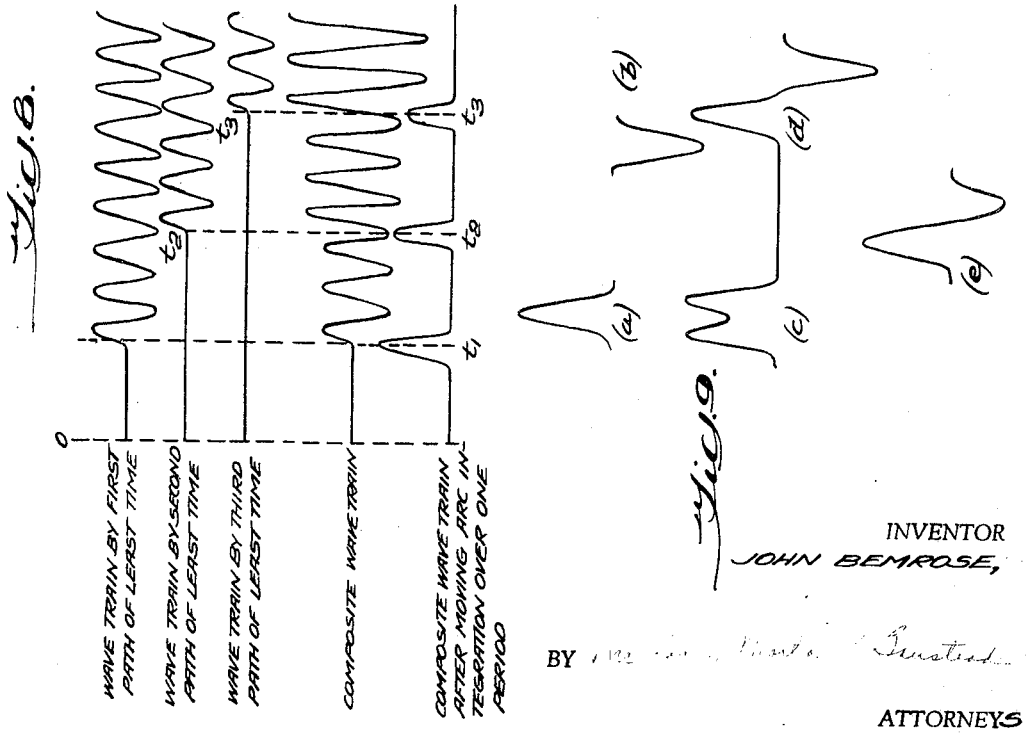

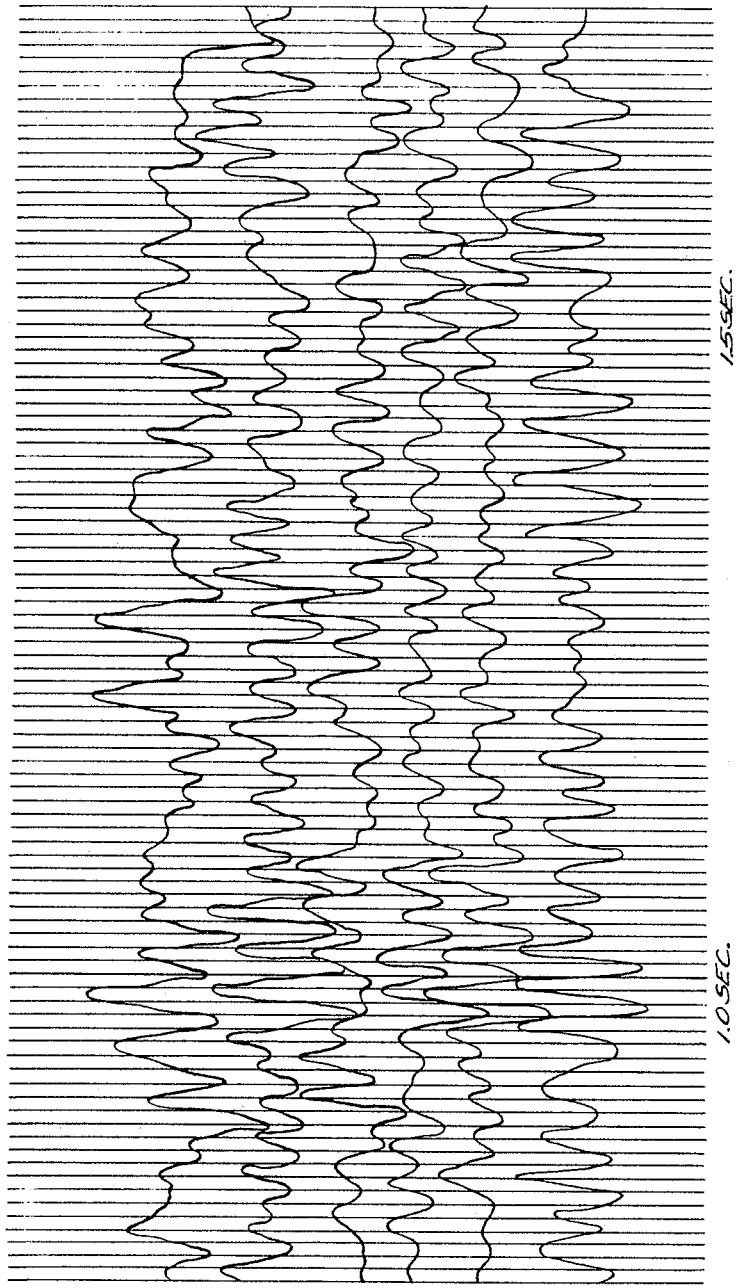

3,363,230
METHOD FOR DETECTING THE ARRIVAL TIME OF SEPARATE WAVE TRAINS IN A COMPOSITE SEISMIC WAVE
John Bemrose, Tulsa, Okla., assignor, by mesne assignments, to Sinclair Research, Inc., New York, N.Y., a corporation of Delaware
Filed May 12, 1965, Ser. No. 455,184
8 Claims. (Cl. 340—15.5)

The present invention relates to seismic methods for investigating subterranean formations and more particularly relates to an improved seismic prospecting system useful in locating subsurface zones not readily detected in conventional seismic prospecting operations. In still greater particularity, the invention relates to a system utilizing continuous sinusoidal compressional waves generated by a vibratory surface source whereby the travel times of signals through the ground can be determined by the use of a non-linear filter and also by the use of a moving arc integration system.

In general, the system of this invention employs as the source of energy a vibrator capable of injecting continuous sinusoidal compressional waves into the surface of the ground and a suitable transducer and amplifier receiving and recording system, including a geophone array, at a location remote from the vibrator source capable of responding to motion of the ground surface due to the arrival of the compressional waves after passage through the ground. It is intended that the vibratory source be operated at essentially constant amplitude and frequency, the frequency being selected for optimum response by the receiving transducer with the duration of the vibrations being at least as long as the longest travel time desired. Briefly, the system operates as follows: A pure continuous sinusoidal compressional wave of essentially constant amplitude and frequency is injected into the ground for a time that is at least as long as the greatest travel time desired, i.e. several seconds, say four seconds. Components of this wave train undergo reflection and refraction and selected phase inversion by the many subsurface layers of velocity discontinuity and, therefore, arrive at any surface geophone with varying relative time delays and amplitudes. The receiver, therefore, will receive a composite wave which is the algebraic sum of the individual wave trains.

The composite wave is, however, in this system of the same frequency as the injected wave as discussed in detail hereinbelow and the recording equipment, therefore, is tuned to this frequency and thus all disturbances of other frequencies that may be produced are eliminated. A non-linear operator or filter or suitable integrator designed to operate on the composite wave train can be used to determine the arrival time of each wave train arriving by different paths. This method has sufficient resolution to permit the detection of the arrival times of the separate wave trains even when they arrive close together with a time difference as small as that of a quarter of a period of the oscillation. This method can also be used to determine if the energy which has been reflected by subsurface strata has undergone phase inversion. The receiver transducer system of this method can be operated with a narrow-pass band filter tuned to the selected operating frequency of the vibration source which gives optimum receiver response thus excluding all other wave trains and noise having frequencies outside the desired frequency.

The purpose and objects of this invention are, therefore, to provide: A means to exploit in a new way surface energy sources in seismic prospecting; a means to determine the travel time of signals through the ground by the use of continuous waves of an essentially constant selected frequency which has an optimum energy response at the recorder for all reflection horizons, or for certain objective horizons or strata whose thickness in wave lengths is more responsive to energy return for some frequencies than to others; a means to determine the travel time of signals which arrive close together such as those due to reflection from the top and bottom of a thin bed of rock when the bed thickness is as small as a quarter of a wave length of the wave train at the selected frequency (this particular means is an advance in the art of stratigraphic mapping by seismic methods by virtue of the greatly increased resolution); a means whereby the travel time of each separately reflected wave train is determinable close to the true reflection time so that, apart from small but constant instrumental time delays, the travel times are correlatable directly with those contained in acoustic logs; a means whereby it is possible in many cases to determine if a particular wave train has undergone phase inversion by reflection at an interface where in the downward direction the acoustic impedance changes to a lower value; a means whereby it is possible to determine travel times of signals through the ground by the use of continuous waves of essentially constant but selected frequency which have undergone refraction at critical angles, making it possible to determine the least time arrivals for the first, second, and other refraction arrivals in a manner familiar in the art of refraction surveying with impulsive sources.

There are many kinds of vibratory systems available commercially which may be operated with a program control and used, when suitably coupled with the ground, to inject compressional waves of constant amplitude and desired frequency into the ground. The moment of commencement and direction of the first motion from rest is under control so that the system has time and motion repeatability permitting subsequent additive compounding of the arriving wave trains either from the same source or from multiple sources of similar characteristics operated with the same program control.

For a discussion of background theory, a more complete understanding of the present invention, and for further objects and advantages thereof, reference may now be had to the following description taken in conjunction with the accompanying drawings in which:

FIGURE 1 schematically illustrates a seismic exploring system in accordance with this invention;

FIGURE 2 displays three sinusoids as oscillogram traces (a), (b) and (c), the composite trace (d) of the individually arriving sinusoids and the square wave trace (e) produced by non-linear filtering of the composite trace (d);

FIGURE 3 displays a composite trace (f) of individually arriving sinusoids, a trace (g) of square waves produced by non-linear filtering of composite trace (f) and a trace (h) of the differentiate square waves;

FIGURE 4 shows individual and composite traces (i)–(l) similar to FIGURE 3;

FIGURE 5 illustrates schematically a continuous wave amplitude analyser for use in the present invention;

FIGURE 6 illustrates a modifier analyser;

FIGURE 7 illustrates the detection of wave train arrival time by moving arc integration;

FIGURE 8 illustrates detection of individual wave train arrival times in the composition wave train;

FIGURES 9a–e illustrate erect and inverted area responses at various degrees of separation;

FIGURE 10 illustrates a continuous wave limit integrator for use in the system of FIGURES 7–10; and FIGURE 11 illustrates an example of area response to reflection arrivals after processing by moving arc integration;

Turning now to FIGURE 1, reference numeral 10 designates an elastic wave generator coupled to the earth's surface 12 and capable of generating an essentially single frequency seismic wave train, represented by line 14. The essentially constant frequency elastic wave produced by generator 10 travels outwardly from the generator in all directions. A portion of the energy transmitted downwardly into the earth, represented by lines 16, will be reflected back toward the surface, represented by lines 18, e.g. upon reaching the first and later discontinuities beneath the surface such as those depicted by lines 20, 21 and 22 in FIGURE 1. The presence of many such discontinuities may result in the arrival of reflected energy at the surface over a period of from 4 to about 6 seconds after the initial impulse from generator 10 has been terminated. The time interval over which reflected energy can be detected at the surface will depend in part, of course, upon the distance of the detection point from generator 10. Energy will arrive at points near the generator before it reaches more distant points. The reflected energy will vary in amplitude depending upon the depth of the discontinuity from which it was reflected and upon the extent to which cancellation and reinforcement occur within the strata through which it passes.

The energy reflected as described above is detected upon reaching the earth's surface by seismic detectors or geophones 24a–f positioned at points removed from the source, generator 10, of the original seismic wave. Energy reaching the geophones 24 by traveling along the earth's surface 12 and energy from other sources, power lines, for example, may be similarly detected. Although only six geophones a–f are shown in FIGURE 1, in most cases it will be preferred to employ a plurality of geophones arranged in a predetermined pattern or array spread over a considerable area. The use of 36 or more geophones in a single array is not uncommon. Many suitable arrays will be familiar to those skilled in the art. Each geophone 24 produces a sinusoidal electrical signal which varies in amplitude in proportion to the amplitude of the reflected energy, represented by lines 18, and noise reaching it. The portion of each signal representing reflected energy occurs in a time sequence corresponding to the sequence in which the original wave was reflected from subsurface discontinuities. The output from geophone 24a, for example, will first indicate energy reflected from discontinuity 20 and will later indicate energy reflected from discontinuity 21 and still later will indicate energy reflected from discontinuity 22. In like manner, energy reflected from discontinuities 20, 21, and 22 will be indicated in order in the output signals from geophones 24b–f. By noting the time at which any phenomenon in the signal occurs, it is thus possible to determine the level of the substrata, e.g. represented by lines 20, 21 and 22, responsible for the phenomenon. It will be recognized that the subsurface structure represented in FIGURE 1 is greatly simplified and that actual subsurface structures are generally much more complex.

The electrical signals produced by geophones 24 are conducted through leads 26 to amplifiers and filters, schematically represented at 28. Each filter 28 can be a broad pass band filter or sharply peaked, narrow band filter whose center frequency is essentially the same as the frequency of the elastic wave emitted by generator 10. It is generally preferred that the band pass characteristics of the filters closely approximate the band width of the generated signal since the frequency of the reflected energy detected by the geophones will normally be the same as or very close to the frequency of the original elastic wave from generator 10 and all the reflected energy will pass the filters whereas energy due to wind effects, power line interference, and similar phenomena which generally have frequencies different from that of the reflected energy will be eliminated by the filters. Surface energy and energy traveling to the geophones by paths other than reflective paths will largely be eliminated by the geophone pattern or array employed and also by recording sequentially the energy from a pattern of vibrator locations so that on summation of the several magnetic tape recordings, the surface waves being largely out of phase are attenuated, and the energy traveling by reflective paths augmented. This is particularly true where relatively high frequencies are employed because the near surface tends to absorb such frequencies to a much greater extent than do the deeper layers and hence vertically traveling energy tends to increase relative to near surface energy. The output from the filters will therefore consist primarily of transients attributable to reflections from the subsurface strata and will be relatively free of noise and interference. The signals thus obtained are amplified in conventional seismic amplifiers and fed to a digital processing system 30 and a recording system 32. It is preferred that the recording system utilized be one productive of a readily reproducible record such as illustrated. Magnetic wire and tape recorders can be utilized, if desired, in preparing reproducible records of the seismic signals. Visual type recording systems producing oscillographic traces, variable area traces, or variable density traces upon a chart or upon a black and white or color-sensitive photographic medium can also be employed. Many suitable recording systems will suggest themselves to those skilled in the art.

FIGURE 2 illusrates oscillogram traces $(a)$, $(b)$ and $(c)$ for three sinusoids each representing a reflected wave 18 and a trace $(d)$ representing the algebraic sum of the instantaneous displacements of the sinusoids, this composite trace being the one that would be recorded at the receiving station 24 by compressional wave trains $(a)$, $(b)$, and $(c)$ arriving at successively later arrival times $(t_1)$, $(t_2)$ and $(t_3)$. Since the equation for the displacement $(y)$ of a continuous sinusoid of amplitude $(A)$ and constant angular velocity $(a)$ as a function of time $(t)$ may be written:

$$y = A \sin \omega t \qquad (1)$$

when vibratory source or generator 10 injects into the ground surface 12 a continuous sinusoidal compressional wave train, the motion commencing with zero displacement at time $t=0$, so that some of the energy is received after reflection or refraction by layers in the ground by a suitable transducer at a receiving station, e.g. geophones 24, on the ground surface 12 at a point remote from the source, the equation for the displacement of the wave at the receiver may be written, $$y = a_1 \sin \omega (t-t_1) \qquad (2)$$

for $t > t_1$, $(t_1)$ being the time of travel of the wave through the ground and $(a_1)$ its amplitude. In general, the wave energy travels from the source 10 to the receiver by a wide variety of paths, e.g. represented by lines 16, 18, each being a path of least travel time. For a path longer than the first and for which the travel time is $(t_2)$ we may write similarly, $$y = a_2 \sin \omega(t-t_2) \qquad (3)$$

for $t > t_2 > t_1$, and for a path longer than the second we may also write, $$y = a_3 \sin \omega(t-t_3) \qquad (4)$$

for $t > t_3 > t_2 > t_1$ and so on for as many travel paths as desired. Oscillogram traces $(a)$, $(b)$ and $(c)$ of FIGURE 2 represent sinuosoids for Equations 2, 3 and 4 and trace $(d)$ represents the algebraic sum of the instantaneous displacements of the sinusoids, this composite trace being the one that would be recorded at the receiving station 24 by compressional wave trains arriving at successively later arrival times $(t_1)$, $(t_2)$ and $(t_3)$. Since the sum of sinusoidal functions of time of different amplitude, but having the same frequency, is another sinusoid of the same frequency, trace $(d)$, see FIGURE 2, the recorded composite trace, has the same frequency as that of the continuous compressional wave train injected into the ground at the source; however, amplitude changes occur at successively later times due to the arrival of wave trains from successively deeper horizons 20, 21, 22 etc. in the subsurface. The first part of trace (d) in the time range ($t_1$) to ($t_2$) has an amplitude ($a_1$) corresponding to sinusoid 2, while the amplitude of the next portion in the time range, ($t_2$) to to ($t_3$), is ($R_2$) corresponding to the sum of sinusoids 2 and 3, the summation being made at the proper phase relationship. For this case it can easily be shown that, $$R_2^2 = a_1^2 + a_2^2 + 2a_1a_2 \cos \omega(t_1-t_2) \quad (5)$$

For the remaining portion of trace (d) for a time range greater than ($t_3$) the resultant amplitude is ($R_3$), this being the amplitude of the sum of the sinusoids 2, 3 and 4 at the proper phase relationships. Here, too, it can easily be shown that, $$R_3^2 = a_1^2 + a_2^2 + a_3^3 + 2a_1a_2 \cos \omega(t_1-t_2)$$
$$+ 2a_1a_3 \cos \omega(t_1-t_3) + 2a_2a_3 \cos \omega(t_2-t_3) \quad (6)$$

The resultant amplitude of the sum of ($n$) sinusoids of the same frequency may be developed similarly.

The determination of the moment in time where the amplitude of the sum of a number of continuous sinusoidal wave trains changes due to the arrival of wave trains at successively later times is one of the principal objects of this invention. This is achieved by the use of a non-linear functional operator or filter which is responsive only to amplitude changes in continuous sinusoids of constant frequency. The operator is defined by the identity, $$F(y) = \dot{y}^2 - y\ddot{y} \quad (7)$$

where the terms ($y$), ($\dot{y}$) and ($\ddot{y}$) are respectively the displacement and the first and second derivatives of the displacement with time. The application of this operator to any sinusoid of constant frequency of the form, $$y = a \sin (\omega t + \theta)$$

can be shown to yield, $$F(y) = a^2\omega^2$$

which is a constant dependent only on the amplitude and frequency of the oscillation. Its application to the composite trace (d) of FIGURE 2 where the amplitude changes from ($a_1$) to ($R_2$) and from ($R_2$) to ($R_3$) yields, $$F(y)_1 = a_1^2\omega^2 \text{ for } t > t_1 < t_2 < t_3 \quad (8)$$
$$F(y)_2 = R_2^2\omega^2 \text{ for } t > t_2 < t_3 \quad (9)$$

and, $$F(y)_3 = R_3^2\omega^2 \text{ for } t > t_3 \quad (10)$$

The operator detects changes in the amplitude of the composite trace precisely at the correct times ($t_1$), ($t_2$) and ($t_3$). These changes are displayed as step displacements in the square wave of trace (e) of the same figure, the displacements being proportional to the responses 8, 9 and 10. If desired, trace (e) can be called a non-linear filtered version of the composite sinusoidal trace (d), the step displacements yielding the travel time of the input sinusoid from the source to the receiver by the several travel paths.

Referring now to FIGURE 3, trace (f) is a more general composite wave train of individually arriving sinusoids and, depending on the amplitude and phase of each new arrival, there may be a corresponding increase or decrease in the amplitude of the composite wave train. The step displacements of the filtered trace (g) corresponding to trace (e) of FIGURE 2 may, therefore, be up or down as illustrated. Trace (h) is the first derivative of the square wave trace (g) and is a preferred output of the non-linear filter with the leading edges of the trace displacements or pips defining the arrival times of the individual wave trains.

On the assumption that the first motion of the vibratory source coupled to the ground is always in the same direction so that the generated compressional wave injected into the ground commences with zero displacement in a known positive or negative direction, it is possible to detect a change of phase in any newly arriving wave train using the method of this invention. A phase change of ($\pi$) occurs on reflection at an interface where the acoustic impedance changes from a high to a lower value and, as already shown above, is equivalent to a change in the sign of the amplitude. This information is valuable in stratigraphic investigations and comparisons with acoustic logs.

The oscillogram traces (i), (j), (k) and (l) of FIGURE 4 show how phase inversion may be detected. The later portion of trace (k) and a newly arriving wave train trace (j) of unknown amplitude ($R_2$) and the object is to find the sign of the amplitude ($R_2$). The arrival of the new wave train trace (j) is indicated by the pip (Q) of trace (l). At a time close to that of (Q), a point (P) is selected on trace (k) at a time earlier than (Q) at a point on the axis where the trace is moving in the positive direction. Taking (P) as a local origin of time and the distance (PQ) corresponding to a time interval ($\Delta t$) we may write for trace (k), $$y = R_1 \sin \omega(t + \Delta t) \quad (15)$$

where the amplitude of the composite wave is given by, $$R_3^2 = R_1^2 + R_2^2 + 2R_1R_2 \cos \omega \Delta t \quad (16)$$

The amplitudes ($R_1$) and ($R_2$) may be conveniently scaled off the oscillogram, and with the known value of ($\Delta t$), two values of ($R_2$) may be computed as roots of (16) treated as a quadratic in ($R_2$). The correct value of ($R_2$) is the one that satisfies (15) in yielding a correct scaled value for the displacement at any convenient time greater than ($t + \Delta t$). If this value is negative and it is known that the first motion of the generator 10 is in the positive direction, then the wave train arriving at the time corresponding to (Q) underwent phase inversion on reflection.

*Continuous wave amplitude analyser*

It has been shown above that when, $$y = a \sin (\omega t + \theta)$$

the output of the non-linear filter yields, $$F(y) = a^2\omega^2$$

and, therefore, differentiating, $$dF(y) = 2\omega^2 a da \quad (17)$$

The square wave output of the filter, therefore, reflects twice the relative amplitude change in the input sinusoid. The preferred output is a time derivative of the square wave, and for this purpose electronic differentiation of a square wave can be made to produce spikes or pips coincident in time with the square wave displacements and with relative amplitudes proportional to the relative amplitudes of the square waves, which in turn, are proportional to twice the relative amplitude changes of the input sinusoid. Further, by choosing a time constant for the C-R circuit which is small compared with the period of the square wave, the pips can be made sharp and highly definitive of the amplitude changes and the time of their occurrence.

The non-linear operator or filter $F(y)$ contains first and second time derivatives of the displacement and may be difficult to achieve by electrical analogues without introducing excessive noise. However, there exists a second operator $f(y)$ which detects only the square of the amplitude of the sinusoid and not the product of the square of the amplitude and the angular velocity which requires only one step of differentiation and one of integration. The operator is, $$f(y) = y^2 - \dot{y}\int y dt \quad (18)$$

which when applied to the sinusoid, $$y = a \sin (\omega t + \theta) \quad (19)$$

yields, $$f(y) = a^2 \sin^2 (\omega t + \theta) + a^2 \cos^2 (\omega t + \theta) = a^2 \quad (20)$$

when the constant of integration is omitted. It is evident that the relative amplitudes of the square wave outputs of the two filters $F(y)$ and $f(y)$ are equal but an electrical analogue may be constructed more easily with the latter filter. Such an electrical analogue termed a Continuous Wave Amplitude Analyser is displayed in FIGURE 5.

As illustrated in FIGURE 5, the input $(y=a \sin \omega t)$ from the ground receiver or transducer, e.g. geophone 24, is passed through an amplifier 100 and divider 102 where four channels 104, 106, 108 and 110 carrying the input are provided. Channel 104 is passed through differentiator $(dy/dt)$ 112 to produce the signal, $a\omega \cos \omega t$, and channel 106 is passed through integrator $(\int y dt)$ 114 to produce the signal, $-a/\omega \cos \omega t$, and then the outputs of differentiator 112 and integrator 114 are multiplied. The output, $-a^2 \cos^2 \omega t$, of multiplier 116 is then inverted to produce an output, $a^2 \cos^2 \omega t$. The inputs, $a \sin \omega t$, in channels 108 and 110 are squared and the output, $a^2 \sin^2 \omega t$, of squarer 120 is added to the output, $a^2 \cos^2 \omega t$, of inverter 118. The output of adder 122 is the desired trace, $a^2$ [see sinusoid 19] and is then passed through square wave differentiator 124 and amplifier 126 after which it can be shown visually or recorded as desired.

FIGURE 6 illustrates schematically another analyser which, although simpler than the analyser of FIGURE 5, contains a small inaccuracy. The inaccuracy will, however, not be too important for certain analyses. Advantage is taken in the analyser of FIGURE 6 of magnetic recording for the recording and reproducing of signals by means of magnetic tape, recording drum, recording and reading heads. In this system a previously recorded sinusoidal wave train, $a \sin \omega t$, containing amplitude variations is reproduced by read head 152 from a magnetic tape recording on drum 150 and passed through amplifier 154. The output $a \sin \omega t$ of amplifier 154 is passed through squarer 156 and divider 158 where the output $a^2 \sin^2 \omega t$ is directed into two channels 160 and 162 for re-recording by heads 164 and 166. Heads 164 and 166 are displaced in phase by $\pi/2$ corresponding to a quarter of a period of the wave train under investigation whose frequency is known. Amplifiers 168 and 170 are provided in channels 160 and 162. A summing read head 172 adds the two displaced sinusoids, one as the square of a sine function and the other as the square of the corresponding cosine function, thus providing an output $a^2 \sin^2 \omega t + a^2 \sin^2 (\omega t + \pi/2)$, equal to $a^2$, and detecting the instantaneous square of the amplitude of the original signal. Square wave differentiator 174 provides an output similar to that obtained in the analyser of FIGURE 5 which is amplified and shown visually or recorded, as desired. In this system there is uncertainty in the time of detection of changes in amplitude, however, which may extend over a quarter of a period of the input signal.

It is possible under certain conditions for a newly arriving wave train to be undetected by the operator because its arrival produces no change in the amplitude of the composite wave train. However, when this is suspected, a change in the frequency can make detection possible. Detection may prove difficult if, for example, in the present examples, the second sinusoid 3 which is $$y = a_2 \sin \omega(t - t_2)$$

undergoes phase inversion on reflection at an interface separating layers of high to low acoustic impedance, the phase change being $\pi$. After reflection, $$y = a_2 \sin(\omega t - \omega t_2 + \pi)$$
$$= -a_2 \sin \omega(t - t_2)$$

which is equivalent to changing the sign of the amplitude $(a_2)$. Now the resultant amplitude of sinusoids 2 and 3 is contained in 5, namely, $$R_2^2 = a_1^2 + a_2^2 + 2a_1 a_2 \cos \omega(t_1 - t_2) \tag{5}$$

and if this amplitude remains unchanged after the arrival of the second wave train of amplitude $(a_2)$, $$R_2 = a_1 \tag{11}$$

and, therefore, from (5), $$a_2 = -2a_1 \cos \omega(t_1 - t_2) \tag{12}$$

Therefore, there may exist certain values of the amplitudes depending in part on the reflection coefficients of the reflection horizons, the frequency of the propagation and the time interval between the reflection events which may make detection of the new wave train difficult. When this is suspected, a change in the frequency can make detection possible.

An alternative to the above method of determination of travel times is as follows. Utilizing Equations 2, 3 and 4 we may write for the composite wave train composed of individual wave trains arriving at the receiver at sequentially later times, $t_1, t_2, t_3, \ldots t_n$, the summation:

$$y = \sum_1^n a_i \sin \omega(t - t_i) \tag{21}$$

$t \geq t_1$ in sequence.

For the first wave train only $(i=1)$, $$y = a_1 \sin \omega(t - t_1) \, t \geq t_1 \tag{22}$$

and if we integrate to find the area under the curve between the limits $-T/2$ to $T/2$ where (T) is the period of the wave train oscillation we obtain:

$$U_1(t) = a_1 \int_{t-T/2}^{t+T/2} \sin \omega(t - t_1) dt$$
$$= -a_1/\omega \cdot [\cos \omega(t - t_1 + T/2)$$
$$- \cos \omega(t - t_1 - T/2] \tag{23}$$

It may now be deduced that there always exists a positive value for $U_1(t)$ provided, $$t - t_1 + T/2 \geq 0$$

and, $$t - t_1 - T/2 \leq 0$$

or provided, $$t \geq t_1 - T/2$$
$$\leq t_1 + T/2$$

and for values of $(t)$ outside these limits the area under the curve between the integration limits $-T/2$ to $T/2$ is always zero.

Putting $$t_1' = t - t_1 + T/2$$

we obtain, $$U_1(t) = -a_1/\omega [\cos \omega t_1' - \cos \omega(t_1' - T)]$$

where $t' - T$ is always $\leq 0$ for the above limits. The arrival time of the sinusoid 22 at the receiver is $(t_1)$ and it is recorded for times $t - t_1 \geq 0$ only. We therefore interpret the sine of negative time values as zero so that the corresponding cosine of the negative time values is unity. Thus we write the last equation as, $$U_1(t) = a_1/\omega \cdot [1 - \cos t_1] \tag{24}$$

with the origin of time for $t_1'$ at $t_1$.

The variation in area under the sinusoid 22 as a function of $(t_1')$ corresponding to a moving arc integration within the above limits in accordance with 24 is the symmetrical curve shown at the bottom of FIGURE 7. It has a maximum positive peak value at time $(t_1)$, the arrival time of the sinusoid 22 at the receiver. The process of moving arc integration over a time interval equal to the period of the oscillation of the sinusoid is therefore the means of finding the arrival time. The curve has a maximum amplitude equal to $2\alpha_1/\omega$ and a half-width amplitude of $\alpha_1/\omega$, the maximum width being equal to the period (T) of the oscillation.

For the second wave train ($i=2$) we obtain from 21, $$y = a_1 \sin \omega(t-t_1) + a_2 \sin \omega(t-t_2) \quad (25)$$

and, in a manner similar to that developed for the first wave train, we find, $$U_2(t) = a_1/\omega \cdot [1-\cos \omega_1'] + a_2/\omega \cdot [1-\cos \omega t_2'] \quad (26)$$

Or, preferably, $$U_2(t) = a_1/\omega \cdot [1-\cos \omega(t-t_1+T/2)]$$
$$+ a_2/\omega \cdot [1-\cos \omega(t-t_2+T/2)] \quad (27)$$

so that there are two responses to variation in area. The first is contained between $t \geq t_1 - T/2 \leq t_1 + T/2$, and the second between $t \geq t_2 - T/2 \leq t_2 + T/2$, there being no response to the process of integration outside these limits.

In line with Equation 21 we may write for ($n$) separate sinusoidal wave trains of the same frequency, the area response to moving arc integration over one period, $$U_n(t) = 1/\omega \cdot \sum_1^n a_i [1 - \cos \omega(t - t_i + T/2)] \quad (28)$$

for $t \geq t_i - T/2 \leq t_i + T/2$ in sequence.

The area response for each separate wave train being zero outside these limits and within the limits the responses are separate and independent but may overlap when the time separation of the wave train arrival times $t_i$, and $t_i+1$ is small.

FIGURE 8 displays three oscillograms for three wave trains with arrival times $t_1 < t_2 < t_3$ respectively, the composite wave train for their sequential arrival and the area response oscillogram after processing the composite wave train with a moving arc integration of the type described. Each wave train arrival is detected as an area response as shown in the bottom trace which peaks at each of the arrival times $t_1$, $t_2$, and $t_3$ thus defining the commencement of each wave train in the composite trace. In the event a wave train of the form, $$y = a_k \sin \omega(t-t_k)$$

undergoes a phase change of $\pi$ by virtue of reflection at an interface separating low to high acoustic impedance so that after reflection, $$y = a \sin(\omega t - \omega t_k + \pi)$$
$$= -a_k \sin(t - t_k)$$

then it is easy to show that the area response will change from the erect version of FIGURE 9a to the inverted version of FIGURE 9b. Thus, this alternate method for the determination of the travel times will also detect phase inversion on reflection. FIGURES 9c, 9d, 9e show, respectively, the effect of two positive area responses of equal amplitude occurring close together, and two area responses when they are in opposite phase of equal amplitude and fairly small time separation and finally two area responses where the events have unequal amplitudes and rather small time separations.

Moving arc integration involves the summation of amplitudes sampled over a chosen period and the introduction of a constant phase shift for the commencement of each sampling interval. Since the method of moving arc integration detects only the arrival of each new wave train and is in no way affected by continuous wave trains remaining in the recording system, since integrtaion of full periods of the oscillation is always zero for these waves, the presence of surface waves having the same frequency as the wave train injected by the vibratory source in no way detracts from the ability of the method to determine accurate travel times of waves that have undergone reflection or refraction. Therefore the method will yield the desired results when the source and receiver are fairly close together, which has not been possible hitherto by surface source seismic methods of prospecting. Thus, this new method of prospecting may be used successfully in mines and other places where of necessity the distance between source and receiver must be small.

Furthermore, since all wave trains leave the recording equipment in the same order to that in which they arrived, shortly after the moment of cessation of the vibratory source, the undesirable effect of recording high energy near surface waves arriving principally by refracted paths and which normally continue to arrive for the full length of the recording time at least can be eliminated from the system by continuing to record after the moment of last motion of the vibrator, this moment being the origin of time for wave trains leaving the system sequentially. Thus, it is possible to operate the vibratory source and receiver in close proximity to one another by causing the receiver to be insensitive to wave train arrivals until shortly after the last motion of the vibrator, this being the time when most of the near surface waves have left the system.

FIGURE 10 shows schematically a system for integrating the composite wave train between any desired limits by utilizing magnetic tape recording as discussed above with respect to the alternate method. In this system, a previously recorded composite wave train recorded on magnetic tape carried on drum 250 is reproduced by a read head 252 and the output, $a \sin \omega t$, is divided equally by divider 254 for re-recording by record heads 256 and 258 on separate and adjacent channels as continuous wave trains. These two identical channels are now re-read by heads 260 and 262 displaced from one another in the direction of recording by a distance on the time scale equal to the time period of the oscillation of the input wave train imparted to the ground by the vibrator. The outputs are fed to two separate integrators 264 and 266 which integrate each of the identical wave trains continuously as the recording drum rotates, one operating at the upper limit of integration and the other at the lower limit of integration. The instantaneous difference in voltage between the storage system of the two integrators is determined by a subtracter 268 and this voltage difference is then passed through an automatic gain control system 277 and then either re-recorded or fed to an oscillogram camera. This continuous variation in voltage difference is the desired area variation response. In the present system the moment commencement of the motion of the vibratory source is the origin of time, this being the moment of first motion of the vibratory source in its enslavement to a long continuous signal of constant amplitude and frequency. It is also intended that on certain occasions a second time origin be used, this being the moment of cessation of motion of the vibratory source. When utilizing the first time origin waves continue to arrive at the receiver after refraction or reflection and they continue to grow in number and as long as the motion of the vibratory source continues until saturation occurs, this being the moment when the energy of the wave trains reflected from great depth or from offset distances is too small to modulate the amplitude of the composite wave train significantly.

When the moment of cessation of the vibrator is used as a time margin, the composite wave train now being saturated the number of wave trains decays progressively from saturation down to zero at background noise. The decay is progressive from short travel times to the longest travel time. Thus, the recording equipment can, if desired, be operated at maximum sensitivity without being overloaded by undesirable surface waves of large amplitude, these being among the first to decay from the record wave train. It may on occasion be even better to operate the recording equipment at a low sensitivity level until shortly after the last motion of the vibratory source so that the high amplitude near surface waves are not recorded at all.

FIGURE 11 shows a specimen oscillogram for six channels of recording of the input wave trains at six separate and independent recording stations after the process of moving arc integration has been applied. Selected events are marked as evidence of reflection of the wave train, peaks and troughs being evidence of reflection in opposite phase. Note that minimum time separation of events is 0.015 sec. Other constants were:

| | |
|---|---|
| Frequency of input wave _____c.p.s__ | 50 |
| Band pass outer frequency _____c.p.s__ | 37–55 |
| Number of vibrators _____ | 3 |
| Number of injected wave trains/vibrator _____ | 40 |
| Number of geophones/channel _____ | 40 |
| Sample interval for digital processing _____sec__ | 0.001 |

The area responses peaks and troughs resemble the response shown in FIGURE 9c and the marked events especially can be correllated by eye very easily from trace to trace. The oscillogram has a time scale with the origin at the moment of injection of the input compressional wave train and therefore the peak or trough of an event with this time scale is the reflection travel time of the wave train when reflected from a particular geological interface.

The moving arc integration can also be accomplished if the composite trace is recorded on magnetic tape and then re-recorded in identical form on an identical channel but displaced in time by an amount equal to the period of the oscillation. If the two traces are summed by passing them under a wide magnetic summing head the output of the head being led to an integrator, the integrator output will yield the desired non-oscillatory wavelet whose peak or trough defines the arrival times of each new wave train in the composite trace. When the composite trace has constant amplitude over one period or more the integrator output is zero. Also, since energy level of surface vibratory seismic sources is small, it is advantageous to make many recordings on channels of magnetic tape side by side with the vibrator at the same location or at a scene of closely spaced locations in order to attenuate surface waves. When the channels of recordings are summed with a wide magnetic summing head, the desired reflection signals, whose phase in each channel remains almost constant for the several closely spaced vibrator locations, are augmented while the undesired surface waves, whose phase is variable by virtue of the many vibrator locations, are attenuated. Advantage of this field procedure can be taken to perform the process of moving arc integration as follows: If the operating frequency is 50 c.p.s. for the wave train injected into the ground by the vibrator, the period will be 20 milliseconds. If the wave train is injected 20 times from each of the 20 vibrator locations but each wave train is delayed one millisecond behind the previous one, then the summation of these separately recorded wave trains is equivalent to integration over one period of oscillation of the injected wave train. Thus, for the composite wave train the summing or integrating process will yield the desired non-oscillatory wavelet whose peak or trough defines the travel time of each new wave train in the composite trace. The time delays are too small to affect the attenuation of the surface waves. The method can be entended to any frequency in the seismic spectrum.

It is claimed:

1. A method for subsurface mapping of strata which comprises injecting a continuous compressional wave of essentially constant amplitude and frequency into the surface of the ground, whereby said wave is propagated through the ground by various paths as separate wave trains for which the travel times to an emerging point on the ground are different, producing a signal representative of a composite of said wave trains at said emerging point after passage of said wave trains through the ground, said wave being injected into the ground for a period of time at least as long as the longest travel time desired, and subsequently producing a signal proportional to the square of the composite wave train amplitude from the signal representative of the composite wave train, the arrival of each separate wave train being indicated by sudden changes in said amplitude from one level to another, whereby the arrival times of each separate wave train which has traveled a path in the subsurface in least time is detectable.

2. The method of claim 1 wherein said detecting step comprises producing a signal proportional to the product of the square of the composite wave train amplitude and its angular velocity, the arrival of each separate wave train being indicated by sudden changes in said product from one level to another due to amplitude change.

3. The method of claim 1 further including producing a signal having spikes coincident in time with said sudden changes and with relative amplitudes proportional to the relative amplitudes of the square waves by time differentiating the signal proportional to the square of the composite wave train amplitude.

4. The method of claim 1 wherein the step of providing said signal proportional to said square of the composite wave train comprises producing from the signal representative of the composite wave train four separate signals each representative of said composite wave train, differentiating a first of said separate signals and integrating a second of said separate signals, producing a multiplied signal representative of the product of the resultant differentiated signal and the resultant integrated signal and inverting the resultant multiplied signal, producing a squared signal by squaring the third and fourth of said separate signals, and then producing a signal representative of the square of the composite wave train amplitude by adding the inverted multiplied signal and the squared signal.

5. A method for subsurface mapping of strata which comprises injecting a continuous compressional wave of essentially constant amplitude and frequency into the surface of the ground, whereby said wave is propagated through the ground by various paths as separate wave trains for which the travel times to an emerging point on the ground are different, producing a signal representative of a composite of said wave trains at said emerging point after passage of said wave trains through the ground, said wave being injected into the ground for a period of time at least as long as the longest travel time desired, and passing the signal representative of said composite wave train through a moving arc integrating system where the length of the arc in time is equal to one period of the oscillation of the continuous compressional wave generated at the ground surface to produce a signal comprising a non-oscillatory wavelet whose peak or trough defines the travel time of each new wave train, said wavelet being inverted for all wave trains that have undergone phase inversion and erect for all wave trains that have not, whereby the arrival times of each separate wave train which has traveled a path in the subsurface in least time is detectable.

6. The method of claim 1 wherein the production of said signal is initiated shortly after the injection of said continuous compressional wave is stopped.

7. The method of claim 5 wherein the production of said signal is initiated shortly after the injection of said continuous compressional wave is stopped.

8. A method for subsurface mapping of strata which comprises injecting a continuous compressional wave of essentially constant amplitude and frequency into the surface of the ground, whereby said wave is propagated through the ground by various paths as separate wave trains for which the travel times to an emerging point on the ground are different, producing a signal representative of a composite of said wave trains at said emerging point after passage of said wave trains through the ground, said wave being injected into the ground for a period of time at least as long as the longest travel time desired, subsequently squaring the signal representative of said composition wave train and dividing the resultant squared signal into two channels, recording said two channels by heads displaced in phase by $\pi/2$ corresponding to a quarter of a period of said waves, producing a summed signal by summing the two displaced signals one as the square of a sine function and the other as the square of the corresponding cosine function to thus detect the instantaneous square of the amplitude of the composite wave train, the arrival of each separate wave train being indicated by sudden changes in said amplitude from one level to another.

References Cited

UNITED STATES PATENTS

| | | | |
|---|---|---|---|
| 2,989,726 | 6/1961 | Crawford et al. | 340—15.5 |
| 3,259,878 | 7/1966 | Mifsud | 340—15.5 |

BENJAMIN A. BORCHELT, *Primary Examiner.*

R. M. SKOLNIK, *Assistant Examiner.*